Feb. 4, 1969 J. A. COOLEY 3,425,120

METHOD OF PRODUCING A CERAMIC GAPPED CERAMET TAPE HEAD

Filed March 2, 1965

John A. Cooley,
*INVENTOR.*
*BY* Harry M. Saragovitz
Edward J. Kelly
Herbert Berl
Jack H. Voigt United States Patent Office 3,425,120
Patented Feb. 4, 1969

3,425,120
METHOD OF PRODUCING A CERAMIC GAPPED CERAMET TAPE HEAD

John A. Cooley, 10121 Parkwood Drive, Bethesda, Md. 20014

Filed Mar. 2, 1965, Ser. No. 436,701
U.S. Cl. 29—603 9 Claims
Int. Cl. H01f 7/06

ABSTRACT OF THE DISCLOSURE

A method of making a tape head core having an essentially toroidal body of ceramic or ferro-spinel material having a vitreous gap therein.

The invention described herein may be manufactured by and for the government, for government purposes, without the payment of royalty thereon.

This invention relates to ceramic gapped tape heads, and more particularly to a ceramic gapped tape head in which the gap is formed as an integral part of the magnetic core structure.

Tape recording, playback and erase heads are generally constructed from laminated iron, and have a mechanical gap of a non-magnetic material. This type of construction results in a tape head having a high hysteresis loss at high frequencies. In order to overcome these difficulties, tape heads are generally made with extremely fine laminations and, in some cases, of powdered iron. In both extremes, the material becomes hard to handle by automatic machines, and the final product becomes very delicate. All of these problems are, of course, compound by engineering demands for means of recording higher and higher frequencies, television and computer recording applications and the increasing use of rotating heads in video recorders.

Data processing, control and computing devices have also made demands on the tape recording art for heads having good wearing qualities. In computers, the tape, coated with magnetic iron oxide, a good abrasive, is run back and forth across the heads hundreds of thousands of times. Since the usual head is composed of soft iron and a soft metallic gap element (usually gold) the wear is even more accentuated. It is not uncommon for recording and playback heads in high speed memory devices to be replaced bimonthly. When the cost of replacing high quality heads is considered, in addition to the down time of the computer, it can be appreciated that a great saving would result if the recording heads could be made of a material having a longer wearing time.

Conventional methods of increasing the wearing time of heads by potting in epoxy resins are generally inadequate. Heads made of ceramic materials (ceramets) suffer from the fact that while the body, or core, may be of ceramet, the gap is still a soft metal, subject to rapid wear. Further, polishing and cementing the faces of the core to the gap is time consuming and expensive, due to the hard nature of the materials involved and breakage due to their inherent brittleness.

Therefore it is an object of this invention to provide a ceramet tape recording, playback or erase head having an integral ceramic gap, and to provide a means of producing such a head and such a gap.

It is a further object of this invention to produce a simple and inexpensive core having a ceramic gap of high quality and possessing superior high frequency response and decreased hysteris loss.

It is a yet further object of my invention to produce a ceramic gapped ceramet tape head of vastly superior wearing qualities, as well as other desirable qualities which will become evident upon examination of the following specification, taken in conjunction with the drawings, in which.

It is generally recognized in the art that a torus is the most desirable form for magnetic core materials, since this shape conforms to the natural magnetic paths introduced by inductance. Therefore it is desirable that, in producing a recording head core, that an essentially toroidal shape be employed. This is particularly true when a powdered material is being formed, since manufacture is then not limited by cutting or shaping.

Figure 2:
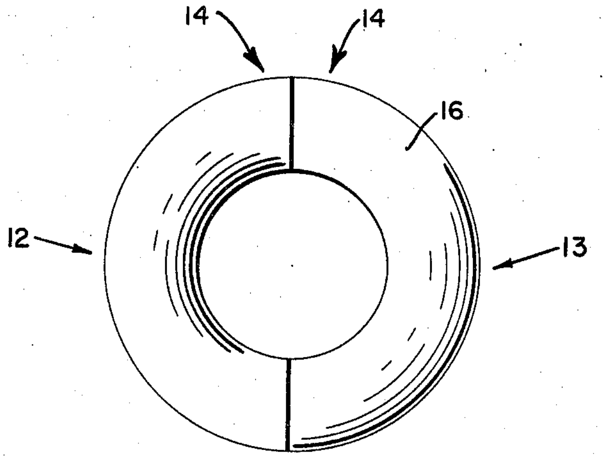
FIGURE 2 shows a completely assembled and processed core.

The device of the present invention, as shown in FIGURE 2, provides a toroidal core which is cut to form two torus halves 14, each having an exposed surface 16.

Figure 1:
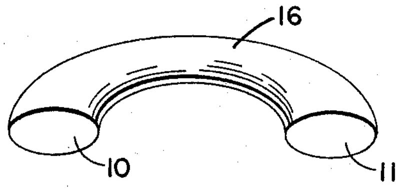
FIGURE 1 shows a perspective view of a half-torus core.

From FIGURE 1, it can be plainly seen that the cut in the core is straight, providing polished faces 10 and 11 and is represented by a plane, passing through the center of the core, normal to the plane of the equator of the core. The cross section is shown to be circular although it could be oval or even square, since the toroidal shape is the most important feature. Other shapes may be desired for ease of winding or handling.

The core material is a ferro-spinel or ferrite having a small amount of silicon dioxide added. For example, a suitable material has been found to have the composition (by weight) 12 parts ZnO, 17 parts MnO and 4 parts $SiO_2$. Small amounts of iron (1/10 of 1 part) may be added to flux the $SiO_2$. This composition is thoroughly mixed in the finely powdered state, and pressed into the shape discussed above. At this time the front, or gap, faces 10, 11 may be polished until a smooth and close fit is obtained between halves. The core sections are then fired at a temperature which will cause the $SiO_2$ to become viscous under the fluxing action of the iron. As the $SiO_2$ melts to form a glass, it permeates between the tightly packed magnetic materials, binding them together. As the glass continues to flow, a smooth capillary layer collects on exposed surfaces 16. This is, in effect, a thin glass cover on the enclosed materials. This capillary cover also collects on the polished faces 10, 11 of the half-torus.

While the capillary surfaces are still molten, the temperature is maintained constant, and two torus halves are placed together as in FIGURE 2, and pressure applied, as indicated by arrows 12, 13, at right angles to the axes of symmetry of the torus, and at positions 90° removed from either gap. This results in a pressing together of the two viscous capillary surfaces on the faces 10, 11. As the pressure is applied, the glass between the faces will flow slowly outward and be taken up by the outer surfaces about the gap. As the flow takes place, the two sections are bonded together by the glass, producing a vitreous separation between the two torus halves 14. This glass gap has very desirable properties, as will be seen.

When the joining and viscous glass flow is completed, the entire assembly is allowed to cool slowly, careful control being maintained over the temperature, in order to prevent sudden temperature drops which would create strains in the glass. This process is similar to annealing.

An alternative composition to the ferrites or ferro-spinel as decribed above, is the use of a ceramet, in essentially the same manner. In producing a ceramet, powdered iron, $SiO_2$ and, if desired, a binder are used. A satisfactory composition is 10 parts Fe, 2 parts $SiO_2$ and 2 parts kaolinite. The procedure with a ceramet is essentially the same as above, except that cooling must be begun very shortly after joining, in order to prevent iron from bridging the gap. In this case, of course, the handling is more difficult, since both iron and glass are molten. In fact, it may be necessary to use supporting molds, despite the stabilizing influence of the kaolinite filler. This makes the ceramet core more difficult to make, but has certain attendant advantages, as will be seen.

Figure 3:
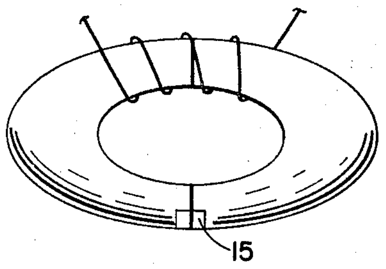
FIGURE 3 shows a semi-symbolic, completed recording head made in accordance with the principles of this invention.

When the core, as described above, whether a ferrite, ferro-spinel or a ceramet, is completed, a small flat portion 15 is ground across one of the gaps to make a tape contact surface. This surface is ground and polished flat, and the magnetic coil is wound, as shown in FIGURE 3 to produce the completed head.

The ferrites and the ferro-spinel heads are most easily produced, as indicated, by this process, and they have a high resistance to eddy and hysteresis currents; however the reluctance is not as low as the ceramet head, therefore each type of composition has its own advantages. The long route in the ceramet head, caused by the tortuous structure provided by the filler and glass also results in a high resistance to eddy and hysteresis currents, since:

$$\oint E \cos \textcircled{H} dl = \frac{dl}{d} \int\int_s \beta \cos \textcircled{H}' ds$$

where $$\int\int_s \beta \cos \textcircled{H}' ds$$

is the magnetic flux traversing the circuit enclosed by the torus, and the EMF drop is $$\oint E \cos \textcircled{H} dl$$

where E is the electric field intensity in volts/meter, $\beta$ is the magnetic flux density in webers/sq. meter, $dl$ is an element of length in meters, $ds$ is an element of area in square meters, and Ⓗ is the angle between the direction of the electric field intensity and the line element, while Ⓗ′ is the angle between the magnetic flux density and the normal to the plane of the torus. Thus it can be seen that an increase in the magnetic path length $dl$ will result in a direct increase in the resistance to eddy currents and hysteresis loops, a desirable effect, since these detract from recording sharpness.

In the case of the ceramet, a higher compression of iron powder should be used than in the case of the ferro-spinels, since voids are less tolerable, because of the liquid properties of both elements, which results in a tendency to blow gas from any cavities or occlusions.

The wearing properties of these heads are markedly enhanced over the usual head, because of the hard glass, which tends to resist wear very greatly. Since the glass gap and the glass binder provide the main bulwark against wear, it is therefore desirable to use a very hard glass whenever possible, and to this end, the iron flux may be omitted in the ferro-spinel heads, in order to obtain a harder glass. This is especially true since the ferro-spinels retain a structural integrity under high temperatures, although metallic contamination can become difficult under these conditions.

Those familiar with the art will realize that this invention employs a glass binder for magnetic materials, and, by the proper treatment produces a capillary film which is employed to make a non-magnetic gap of small dimensions for use in tape recording heads, and that these elements of novelty produce a superior tape recording head core. Those skilled in the art will also further understand that many like applications are possible for these novel features, hence it is not intended that the particular materials or procedures in the foregoing specification should place any limitation, either expressed or implied on the claims.

I claim:

1. A process for producing a tape head core, comprising the steps of forming a magnetic material, with an appreciable quantity of silicon dioxide, to the shape of a portion of a tape head core, heating said material until said silicon dioxide becomes a glass, maintaining said heat until said glass forms a capillary cover, pressing at least two portions of said formed material together while said glass is still molten to form a complete tape head core, mating faces of said portions, forming thereby a vitreous gap between said portions.

2. A process as in claim 1, wherein said mating surfaces are polished prior to heating.

3. A process as in claim 2, wherein traces of iron are included to flux said glass.

4. A process as in claim 3, wherein said magnetic material comprises a substantial majority of iron.

5. A process as in claim 3, wherein said magnetic material comprises a ferro-spinel.

6. A process as in claim 3, wherein said magnetic material comprises a ferrite.

7. A process as in claim 4, wherein said glass bonds said portions together.

8. A process as in claim 5, wherein said glass bonds said portions together.

9. A process in claim 6, wherein said glass bonds said portions together.

References Cited

UNITED STATES PATENTS

| | | | |
|---|---|---|---|
| 2,992,990 | 7/1961 | Parker | 29—608 |
| 3,123,787 | 3/1964 | Shifrin | 29—602 |
| 3,145,453 | 8/1964 | Duinker et al. | 29—603 |
| 3,188,400 | 6/1965 | Vilensky. | |

JOHN F. CAMPBELL, *Primary Examiner.*

D. C. REILEY, *Assistant Examiner.*

U.S. Cl. X.R.

29—602, 608